United States Patent [19]

Esterowitz et al.

[11] Patent Number: 5,003,547
[45] Date of Patent: Mar. 26, 1991

[54] ROOM-TEMPERATURE, FLASHPUMPED, 1.96 MICRON SOLID STATE LASER

[75] Inventors: Leon Esterowitz, Springfield, Va.; Gregory J. Quarles, Bowie; Joseph F. Pinto, Laurel, both of Md.

[73] Assignee: The United States of America as represented by the Secretary of the Navy, Washington, D.C.

[21] Appl. No.: 459,211

[22] Filed: Dec. 29, 1989

[51] Int. Cl.$^5$ .............................................. H01S 3/16
[52] U.S. Cl. ..................................... 372/41; 372/99; 372/91; 372/19
[58] Field of Search ................. 372/99, 19, 108, 41, 372/68, 91

[56] References Cited

U.S. PATENT DOCUMENTS

| | | | |
|---|---|---|---|
| 3,711,787 | 1/1973 | Snitzer et al. | 372/19 |
| 3,727,150 | 4/1973 | Robinson et al. | 372/99 |
| 4,615,034 | 9/1986 | von Gunten et al. | 372/99 |
| 4,811,349 | 3/1989 | Payne et al. | 372/41 |
| 4,841,530 | 6/1989 | Chai et al. | 372/41 |

OTHER PUBLICATIONS

Publication, High Efficiency 2.09 um Flashlamp-Pumped, Laser, by G. J. Quarles, Annette Rosesnbaum, Charles L. Marquardt, and Leon Esterowitz, Applied Physics Letters 55(11), 11 Sep. 1989.
Publication, Thulium Yag Laser Operation at 2.01 μm, by Mark E. Storm, Donald J. Gettemy, Norman P. Barnes, Patricia L. Cross and Milan R. Kokta, Applied Optics, vol. 28, No. 3, 1 Feb. 1989.

Primary Examiner—Frank Gonzalez
Assistant Examiner—Susan S. Morse
Attorney, Agent, or Firm—Thomas E. McDonnell; George Jameson

[57] ABSTRACT

A room temperature solid state laser for producing a laser emission at a wavelength of substantially 1.96 microns is disclosed. In a preferred embodiment, the laser includes: a laser cavity defined by a plurality of coated reflective elements to form a reflective path thereamong; a laser crystal disposed in the laser cavity and capable of lasing at substantially 1.96 mircons and 2.01 microns when excited; and means for exciting the laser crystal to lase at substantially 1.96 microns and at substantially 2.01 microns. The laser crystal is comprised of a host crystal material capable of accepting $Cr^{3+}$ and $Tm^{3+}$ ions. Through their respective reflectivities at each of the wavelengths at substantially 1.96 microns and 2.01 microns, the coated reflective elements collectively operate to produce substantial loss in radiation at the wavelength of substantially 2.01 microns and to reflect radiation from the excited laser crystal at a wavelength which will sustain a laser emission only at a wavelength of substantially 1.96 microns.

19 Claims, 2 Drawing Sheets

ROOM-TEMPERATURE, FLASHPUMPED, 1.96 MICRON SOLID STATE LASER

CROSS-REFERENCE TO RELATED APPLICATION

This patent application is related to the co-pending United States patent application entitled "A Room-Temperature, Flashpumped, 2 Micron Solid State Laser With High Slope Efficiency", Serial No. (Navy Case No. 72,360), filed Dec. 22, 1989, both of which applications being commonly assigned to the Government of the United States.

BACKGROUND OF THE INVENTION

1. Field of the Invention

The present invention relates to lasers and particularly to a flashpumped solid state laser which operates at a wavelength of 1.96 microns at or near room temperature.

2. Description of the Prior Art

Development of room temperature solid state lasers in the two micron spectral range has received renewed attention recently because of potential applications in medicine and optical communications.

Two important criteria which determine the effectiveness of a laser source in medical applications include the absorption coefficient of the tissue specimen at the operating wavelength, and the availability of a suitable fiber optic delivery system. In the near infrared wavelength region, laser ablation is most effective at 1.93 microns and 2.94 microns, which correspond to tissue absorption peaks. In addition to operating near an absorption peak of tissue, it is also important to consider the availability of a suitable fiber optic delivery system at the output wavelength of the laser system. With regard to transmission, flexibility, durability, and non-toxicity, the best optical fibers for medical applications are silica based fibers. These fibers have demonstrated excellent performance in the wavelength region between 0.3 microns and 2.1 microns.

Several flashpumped and laser (including diode lasers) pumped solid state lasers have recently been demonstrated to operate in the 2 micron region at room temperature. To date, all of the medical studies with these lasers have employed wavelengths longer than 2 microns. However, it has been shown that the peak absorption of water, and therefore of tissue, is in the spectral region between 1.90 microns and 1.98 microns.

OBJECTS OF THE INVENTION

Accordingly, one object of the invention is to provide an efficient, flashpumped, 1.96 micron solid state laser.

Another object of the invention is to provide a flashlamppumped, $Cr^{3+}-$ and $Tm^{3+}-$ doped laser crystal disposed in a cavity defined by coated reflective elements which reflect radiation from the excited laser crystal at a wavelength which will sustain a laser emission only at a wavelength of substantially 1.96 microns.

Another object of the invention is to provide a flashlamppumped, solid state laser having a host crystal material selected from the group consisting of YAG, YSGG, GSGG, GSAG, YSAG, YAlO, GGG, YGG and LLGG, and with the host crystal material being doped with an effective amount of $Cr^{3+}$ ions and with an effective amount of $Tm^{3+}$ ions.

Another object of the invention is to provide an efficient flashpumped 1.96 micron laser that operates at room temperature.

Another object of the invention is to efficiently generate a laser emission at a wavelength of substantially 1.96 microns with at least a 1% slope efficiency at or near room temperature.

A further object of the invention is to provide a pulsed, flashpumped YAG laser effectively doped with sufficient $Cr^{3+}$ and $Tm^{3+}$ ions to produce laser emission pulses at a wavelength of substantially 1.96 microns with a slope efficiency of at least 1%.

SUMMARY OF THE INVENTION

These and other objects of the invention are achieved by providing a room-temperature solid state laser for producing a laser emission at a wavelength of substantially 1.96 microns with a slope efficiency of at least 1%. The room-temperature solid state laser comprises: a laser cavity defined by a plurality of coated reflective elements to form a reflective path thereamong; a laser crystal disposed in the laser cavity and capable of lasing at substantially 1.96 microns and 2.01 microns when excited; and means such as a flashlamp for exciting the laser crystal to lase at laser lines or wavelengths of substantially 1.96 microns and 2.01 microns.

The laser crystal is comprised of a host crystal material capable of easily accepting $Cr^{3+}$ and $Tm^{3+}$ dopant ions. The selected host crystal material is doped with an effective amount of $Cr^{3+}$ ions and with an effective amount of $Tm^{3+}$ ions.

Through their respective reflectivities at each of the wavelengths emitted by the excited laser crystal at substantially 1.96 microns and 2.01 microns, the coated reflective elements collectively operate to produce substantial loss in radiation from the excited laser crystal at the wavelength of substantially 2.01 microns and to reflect radiation from the excited laser crystal at a wavelength which will sustain a laser emission only at a wavelength of substantially 1.96 microns.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
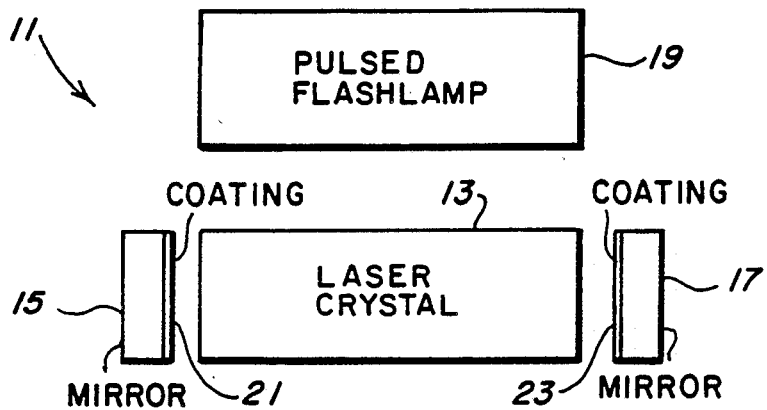
FIG. 1 illustrates a first embodiment of the invention.

Referring now to the drawings, FIG. 1 illustrates a chromium-and thulium-doped laser in accordance with the invention. Laser 11 is comprised of a laser rod or crystal 13 placed between a pair of aligned reflective elements or mirrors 15 and 17, or other cavity forming means, to form a resonator. An excitation means, such as a flashlamp 19 is placed in close proximity to the laser rod 13 to pump the laser rod or crystal 13. The flashlamp 19 can be pulsed by means (not shown) to emit pulses of light at a pulse repetition frequency of, for example, one Hertz (1 Hz).

The laser crystal or rod 13 has a laser host crystal material (not shown) which is selected from the broad group consisting of YAG (yttrium aluminum garnet), YSGG (yttrium scandium gallium garnet), GSGG (gadolinium scandium gallium garnet), GSAG (gadolinium scandium aluminum garnet), YSAG (yttrium scandium aluminum garnet), YAlO (yttrium aluminum oxygen), GGG (gadolinium gallium garnet), YGG (yttrium gallium garnet), LLGG (lanthanum lutetium gallium garnet). As mentioned before, the host crystal material could also be comprised of mixtures or combinations of this group of crystal materials. The preferred group of host crystal materials is comprised of YAG, YSAG and YSGG, and the most preferred host crystal material is YAG.

The selected host crystal material of the laser crystal or rod 13 is doped with an effective amount of $Cr^{3+}$ (chromium) sensitizer ions and with an effective amount of $Tm^{3+}$ (thulium) activator ions. When the laser rod 13 is pumped or excited by a light pulse from the flashlamp 19, the laser rod 13 develops an output pulse of laser emission (to be explained).

The chief characteristic or requirement of a selected host crystal material is that it must have the capability of easily accepting a transition metal ion (such as $Cr^{3+}$ in this description) and a lanthanide or trivalent rare earth ion (such as $Tm^{3+}$ in this description). The dopant $Cr^{3+}$ ions and $Tm^{3+}$ ions must go into the host crystal material without significantly distorting the lattice of the host crystal material so that the quality of the host crystal material remains high.

The $Cr^{3+}$ ions are the sensitizer ions and their concentration is chosen so that there is good absorption into the host crystal material of the excitation pump from the flashlamp 19. If the $Cr^{3+}$ concentration is too low, there will be poor coupling of the excitation from the flashlamp 19 into the host crystal material. However, if the $Cr^{3+}$ concentration is too high, it will cause thermal lensing and other deleterious effects to the performance of the laser crystal 13. The term "effective amount of $Cr^{3+}$ ions" means that the concentration of $Cr^{3+}$ ions in the host crystal material is sufficient to cause close to a 100% absorption of the excitation from the flashlamp 19 into the host crystal material, in addition to achieving uniform pumping throughout the laser host crystal material. The optimum $Cr^{3+}$ concentration will vary with the dimensions of the host crystal material of the laser crystal or rod 13. Since uniform absorption or pumping is desirable, a lower $Cr^{3+}$ concentration should be used for a larger diameter rod 13, while a higher $Cr^{3+}$ concentration should be employed for a smaller diameter rod 13.

The $Tm^{3+}$ ions are the activator ions which are responsible for lasing. The $Tm^{3+}$ concentration must be high enough so that an efficient cross-relaxation process (to be explained), which populates the upper laser level, takes place. In addition, the $Tm^{3+}$ and $Cr^{3+}$ concentrations must be high enough so that an energy transfer between the $Cr^{3+}$ sensitizer ions and the $Tm^{3+}$ activator ions is efficient. However, if the $Tm^{3+}$ concentration is too high, losses will increase and the performance of the laser crystal 13 will suffer due to ground state absorption since the lower laser level is the ground state. The term "effective amount of $Tm^{3+}$ ions" means that the concentration of $Tm^{3+}$ ions in the host crystal material is sufficient to enable a cross-relaxation process to be achieved with close to 100% effectiveness.

The host crystal material can be selected from the abovelisted broad group of crystals (YAG, YSGG, GSGG, GSAG, YSAG, YAlO, GGG, YGG and LLGG) and be doped with an amount of $Cr^{3+}$ ions between about 0.3% and about 3% and with an amount of $Tm^{3+}$ ions between about 3% and about 12%. The host crystal material is preferably selected from the preferred group of YAG, YSAG and YSGG crystals and is doped with a preferred amount of $Cr^{3+}$ ions between about 0.3% and about 1.5% and with a preferred amount of $Tm^{3+}$ ions between about 4.5% and about 7.5%. The host crystal material is most preferably YAG and is doped with a most preferred amount of $Cr^{3+}$ ions between about 0.6% and about 0.9% and with a most preferred amount of $Tm^{3+}$ ions between about 5% and about 6%.

It should be noted at this time that, by the use of the percentage (%) ranges used in conjunction with the term "amount of $Cr^{3+}$ ions", it is meant the percent of substitution of the $Cr^{3+}$ ions for the aluminum ions in YAG, for the scandium and gallium ion combination in YSGG, for the scandium and gallium ion combination in GSGG, for the scandium and aluminum ion combination in GSAG, for the scandium and aluminum ion combination in YSAG, for the aluminum ions in YAlO, for the gallium ions in GGG, for the gallium ions in YGG or for the lutetium and gallium ion combination in LLGG. For example, an effective amount of $Cr^{3+}$ ions of 0.6% in a YAG host crystal material means that the $Cr^{3+}$ ions are substituted for (or replace) 0.6% of the aluminum ions in the YAG crystal.

Similarly, by the use of the percentage (%) ranges used in conjunction with the term "amount of $Tm^{3+}$ ions", it is meant the percent of substitution of the $Tm^{3+}$ ions for the yttrium ions in YAG, for the yttrium ions in YSGG, for the gadolinium ions in GSGG, for the gadolinium ions in GSAG, for the yttrium ions in YSAG, for the yttrium ions in YAlO, for the gadolinium ions in GGG, for the yttrium ions in YGG or for the lanthanum ions in LLGG. For example, an amount of $Tm^{3+}$ ions of 6% in a YAG host crystal material means that the $Tm^{3+}$ ions are substituted for (or replace) 6% of the yttrium ions in the YAG crystal.

It should be noted at this time that the selected host crystal material is doped with the effective amount of $Cr^{3+}$ ions and with the effective amount of $Tm^{3+}$ ions by applying techniques well known to those skilled in the art and, hence, requires no further description of such techniques.

In the operation of the laser 11 of FIG. 1, a light pulse from the pulsed flashlamp 19 enables the laser rod 13 to produce two laser lines or wavelengths at 2.01 microns and at 1.96 microns, with the laser line at 2.01 microns being stronger than the laser line at 1.96 microns.

It should be realized that for medical applications the 1.96 micron laser line is much more desirable than the 2.01 micron laser line, since the 1.96 micron laser line lies within the spectral region between 1.90 microns and 1.98 microns, which is the range of the the peak absorption of water (and therefore of tissue). If nothing is done to change the operation of the laser 11, the stronger 2.01 micron laser line will prevail and the laser 11 will produce a laser emission at a wavelength of substantially 2.01 microns.

In order for the laser 11 to produce a laser emission at a wavelength of substantially 1.96 microns, the laser gain for the 2.01 micron laser line must be suppressed within the laser cavity defined by the mirrors 15 and 17, while the 1.96 micron laser line from the laser crystal 13 must be amplified so that the laser gain of the laser 11 is larger at 1.96 microns than it is at 2.01 microns.

To introduce a loss at 2.01 microns and a gain at 1.96 microns in the laser 11, specifically designed coatings 21 and 23 are respectively deposited on the mirrors 15 and 17. The transmission and reflection characteristics of the coatings 21 and 23 of the respective laser cavity mirrors must be carefully selected so that the high gain thulium transition at 2.01 microns is suppressed and the low gain thulium transition at 1.96 microns (FIG. 2) has a low enough threshold so that it can lase.

After a parametric study by the applicants of laser performance as a function of a wide range of mirror reflectivities and output coupler (output mirror 17) values for the 1.96 micron and 2.01 micron wavelengths, it was determined that the product of the reflectivities (hereinafter referred to as "reflectivity product") of the coated mirrors 15 and 17 should be at least 75% at 1.96 microns, while the reflectivity product of these coated mirrors should not be more than 25% at 2.01 microns. This study thus indicated that the reflectivity product of the coated mirrors should be sufficiently larger at 1.96 microns than it is at 2.01 microns so that the laser 11 would only produce a laser emission at a wavelength of substantially 1.96 microns.

Figure 2:
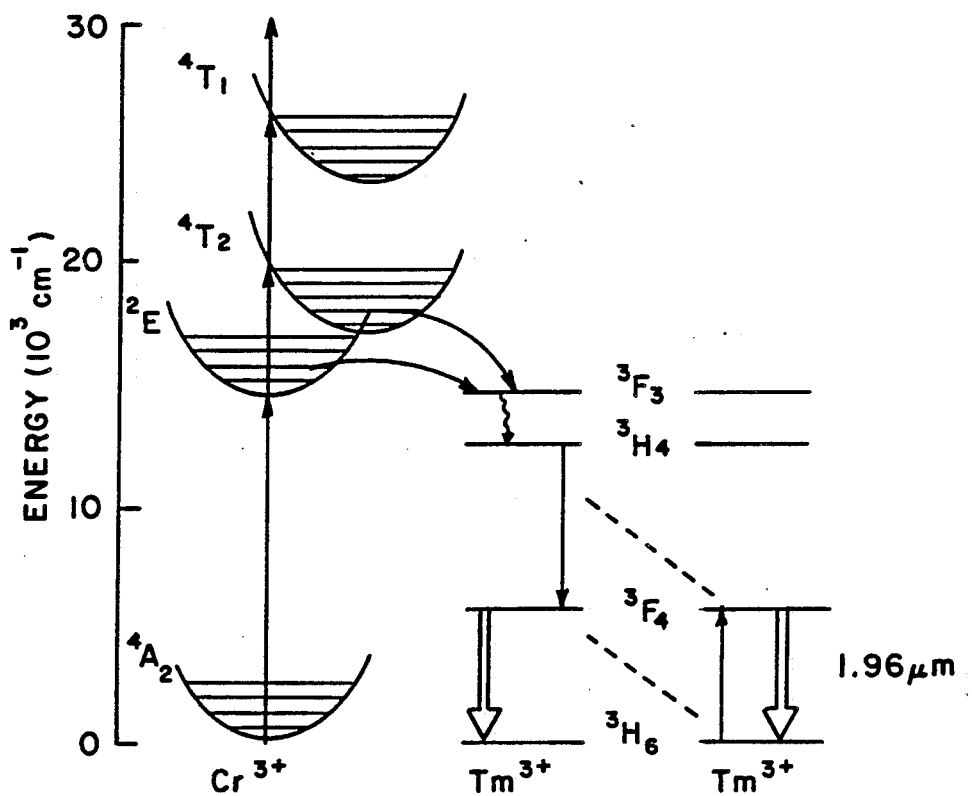
FIG. 2 illustrates the various energy levels of a chromium- and thulium-doped laser crystal.

Exemplary coatings 21 and 23 for the respective mirrors 15 and 17 were fabricated so that the coated mirror 15 had substantially a 99% reflectivity at 1.96 microns and substantially a 70% reflectivity at 2.01 microns, while the coated output mirror 17 had substantially a 90% reflectivity at 1.96 microns and substantially a 30% reflectivity at 2.01 microns. With such coated mirrors 15 and 17, it was found that the laser 11 would only produce an output laser emission at substantially 1.96 microns (FIG. 2). The reflectivity products of these coated mirrors were calculated to be about 89% at 1.96 microns and about 21% at 2.01 microns.

The coatings 21 and 23 for the respective mirrors 15 and 17 are fabricated by any of the well known techniques in the art. With the above parameters established for the reflectivities of the mirrors 15 and 17, it is well known in the art how to fabricate the coatings 21 and 23 onto the respective mirrors 15 and 17 to achieve the required reflectivities for the coated mirrors 15 and 17. In a similar manner, if only the reflectivity products at the 1.96 micron and 2.01 micron wavelengths were given to the supplier or manufacturer of such coated mirrors, he could allocate reflectivities for the coatings 21 and 23 for the respective mirrors and readily make the desired coated mirrors 15 and 17.

With the multilayer coatings 21 and 23 disposed on the respective mirrors 15 and 17, the resultant coated mirrors 15 and 17 collectively operated to produce a substantial loss in the 2.01 micron laser line from the excited laser crystal 13 and to reflect radiation from the excited laser crystal 13 at a wavelength which would sustain a laser emission only at the wavelength of substantially 1.96 microns. In addition, the abovedefined effective amounts of $Cr^{3+}$ and $Tm^{3+}$ are sufficient to enable the excited laser crystal to produce the output laser emission at substantially 1.96 microns with a slope efficiency of at least 1%.

A more detailed description of the exemplary composition of the laser crystal or rod 13 and the operation of the laser rod 13, as well as the operation of the laser 11 of FIG. 1, will now be given by now referring to FIG. 2.

FIG. 2 illustrates the various energy levels of the chromium ($Cr^{3+}$) and thulium ($Tm^{3+}$) doped laser crystal or laser rod 13 of FIG. 1. More specifically, FIG. 2 is a diagram of the various energy levels for the $Cr^{3+}$ and $Tm^{3+}$ ions in the laser rod 13, which can be comprised of an exemplary YAG host material. The importance of the $Cr^{3+}$ to $Tm^{3+}$ transfer efficiency to the 1.96 micron laser operation can be seen from the pumping scheme illustrated in FIG. 2.

In operation, each light pulse from the flashlamp is absorbed in the $^4T_1$ and $^4T_2$ bands of the $Cr^{3+}$ ions. After a nonradiative decay to and within the $^4T_2$ and $^2E$ levels or states of the $Cr^{3+}$ ions, the excitation is transferred from the $Cr^{3+}$ ions to the $^3F_3$ and $^3H_4$ states of the $Tm^{3+}$ ions by way of dipoledipole interactions. Nonradiative decay of the $^3F_3$ level places virtually all of the excited $Tm^{3+}$ ions in the $^3H_4$ state. Each excited $Tm^{3+}$ ion then interacts with a ground-state $Tm^{3+}$ in a cross-relaxation process which gives rise to two $Tm^{3+}$ ions in the $^3F_4$ state. This $^3F_4$ state or level is the upper laser level. Lasing or photon emission then occurs at about 1.96 microns as the excited $Tm^{3+}$ ions in the $^3F_4$ upper laser level decay to the $^3H_6$ lower laser level. The above-described 2.01 micron laser line also occurs in this transition from the $^3F_4$ uper laser level to the $^3H_6$ lower laser level. However, as stated before, the reflectivities of the dielectric coated mirrors 15 and 17 suppress the 2.01 micron laser line in the laser cavity defined by the mirrors 15 and 17.

Cross-relaxation is a near-resonant nonradiative process in which an excited $Tm^{3+}$ ion in the $^3H_4$ state decays to the $^3F_4$ state and a neighboring ground-state $Tm^{3+}$ ion is promoted to the $^3F_4$ level, accompanied by the emission of photons. The obvious advantage of this cross-relaxation process or operation is that a single $Tm^{3+}$ ion excited to the $^3H_4$ level generates two $Tm^{3+}$ ions in the $^3F_4$ upper laser level. Experiments have shown that the probability of the $Tm^{3+}$ cross-relaxation occurring is negligible for concentrations of $Tm^{3+}$ ions less than about 2%, but approaches unity for concentrations of $Tm^{3+}$ ions greater than about 5%.

A room temperature laser emission at substantially 1.96 microns was derived, as discussed in relation to FIGS. 1 and 2. In order to generate the laser wavelength at 1.96 microns, the composition of the laser rod 13 was selected to be favorable for all of the processes involved in flashlamp pumping at room temperature. As previously discussed in relation to FIG. 2, these processes were: absorption of the flashlamp light in the $^4T_1$ and $^4T_2$ bands of $Cr^{3+}$, nonradiative transfer of the excitation from the thermally mixed $^4T_2/^2E$ levels of $Cr^{3+}$ to the $^3F_3$ and $^3H_4$ levels of $Tm^{3+}$, and cross-relaxation among $Tm^{3+}$ ions to populate the $^3F_4$ upper laser level.

A laser rod 13 having a YAG ($Y_3Al_5O_{12}$) host material was selected. The YAG laser rod 13 was 5.0 mm in diameter and 76.3 mm in length. The rod ends were polished flat and parallel and had broad anti-reflection coatings centered at 2.0 microns. The laser cavity mirrors 15 and 17 of FIG. 1 are respectively disposed adjacent to the polished ends of the laser rod 13. The diffusereflecting pump cavity had a pumping length of 69 mm so that at least 91% of the rod length was pumped by the flashlamp.

Within the YAG laser rod 13, a $Cr^{3+}$ ion concentration of 5.6 times $10^{19}$ $cm^{-3}$ (which is about a 0.6% concentration of $Cr^{3+}$ sensitizer ions, as defined above) and a $Tm^{3+}$ concentration of 8.3 times $10^{20}$ cm$^{-3}$ (which is about a 6.0% concentration of $Tm^{3+}$ activator ions, as defined above) was chosen.

The $Cr^{3+}$ ion concentration of 5.6 times $10^{19}$ cm$^{-3}$ (or 0.6% concentration) was chosen in order to provide an optimized balance between the efficient absorption of the flashlamp light in the laser rod 13 and uniform pumping of the mode volume in the 5 mm diameter YAG laser rod 13. Changing the value of the $Cr^{3+}$ ion concentration had very little effect (<5%) on the $Cr^{3+}$ to $Tm^{3+}$ transfer efficiency in YAG.

The $Tm^{3+}$ ion concentration of 8.3 times $10^{20}$ cm$^{-3}$ (or 6.0% concentration) was chosen to favor both the $Cr^{3+}$ to $Tm^{3+}$ energy transfer and the $Tm^{3+}$ cross relaxation processes. Previous work had shown that the $Cr^{3+}$ to $Tm^{3+}$ energy transfer was most efficient in a YAG host material, and that it occurs almost exclusively by a direct dipole-dipole interaction. The $Cr^{3+}$ to $Tm^{3+}$ transfer efficiency in the Cr:Tm:YAG material in the laser rod 13 was determined by measuring the $Cr^{3+}$ fluorescence following a pulsed laser excitation and was found to be 97.5%.

The doped laser rod 13 was pumped by a single simmered Xe flashlamp 19 having a 63.5 mm arc length, filled to 630 Torr, with a 4 mm bore diameter. The flashlamp 19 was pulsed at a pulse repetition frequency of one Hertz (1 Hz) to obtain the output laser emission at substantially 1.96 microns.

As stated before, tests have shown that the probability of the $Tm^{3+}$ cross-relaxation was negligible for $Tm^{3+}$ concentrations less than about 2%, but approaches unity for $Tm^{3+}$ concentrations greater than about 5%. The 6% $Tm^{3+}$ used in this description takes full advantage of the $Tm^{3+}$ cross-relaxation process. However, increasing the $Tm^{3+}$ above this 6% level is not advantageous because of losses due to ground-state absorption of the 2.0 micron laser emission.

Figure 3:
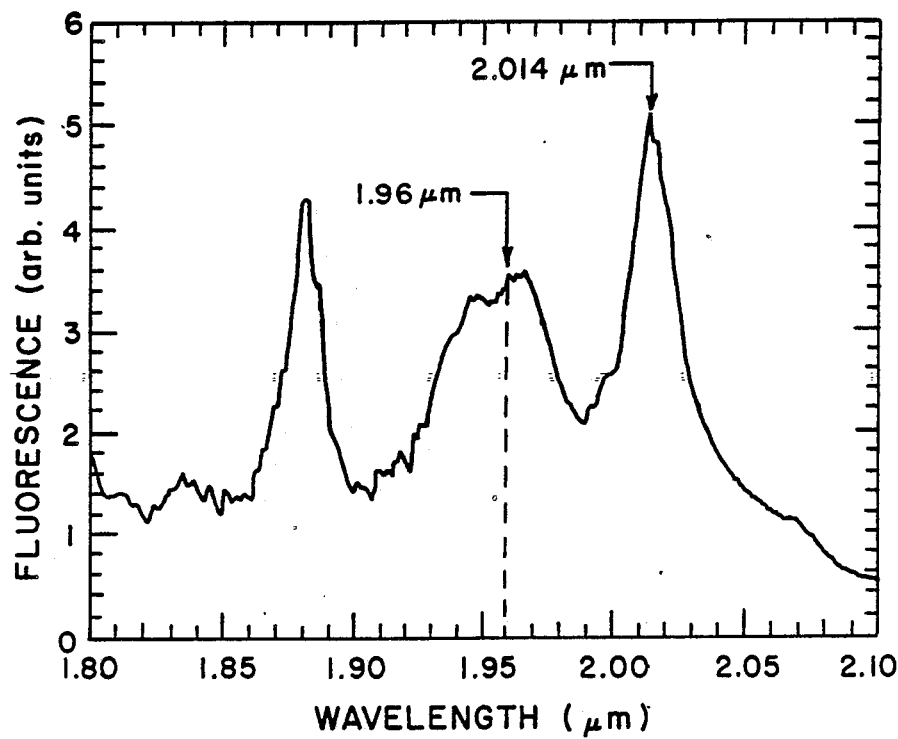
FIG. 3 illustrates the room temperature $Tm^{3+}$:YAG fluorescence spectrum.

FIG. 3 illustrates the room temperature $Tm^{3+}$:YAG fluorescence spectrum. More specifically, the room temperature $Tm^{3+}$:YAG fluorescence spectrum shown in FIG. 3 clearly indicates that the peak of the spectral gain distribution occurs when the laser emission from the laser crystal or rod 13 has a wavelength of 2.014 microns. An adjacent near peak occurs at approximately 1.96 microns. These are the 2.01 micron and 1.96 micron laser lines that were discussed before in relation to FIGS. 1 and 2. They occur due to transitions from different Stark levels between the $^3F_4$ manifold and the $^3H_6$ manifold.

Figure 4:
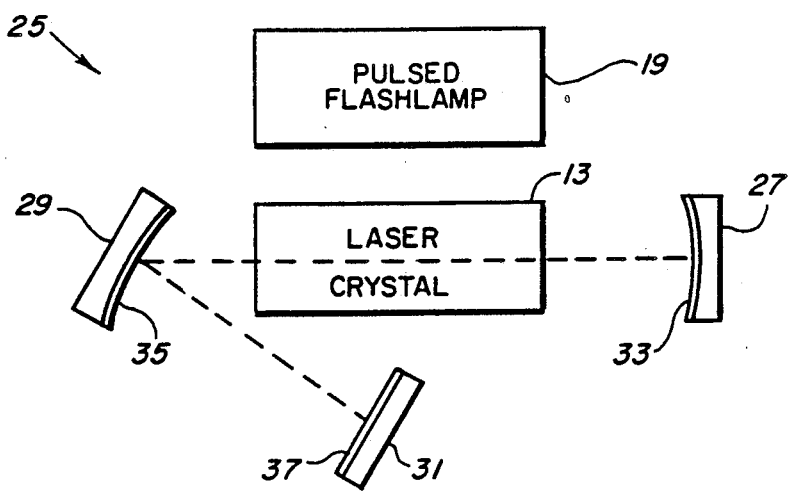
FIG. 4 illustrates a second embodiment of the invention.

Referring now to FIG. 4, a three-mirror embodiment of the invention is shown, as contrasted to the two-mirror embodiment of FIG. 1. Laser 25 is comprised of the laser rod or crystal 13 located inside of a laser cavity defined by reflective elements or mirrors 27, 29 and 31 which are disposed in a configuration to form a triangular reflective path thereamong. An excitation means, such as the pulsed flashlamp 19, is placed in close proximity to the laser rod or crystal 13 to pump the laser rod 13.

The laser rod or crystal 13 and the pulsed flashlamp 19 are identical in structure and operation to the same elements shown in FIG. 1 and previously discussed and, hence, require no further explanation. In the three-mirror embodiment of FIG. 4, only the mirrors 27, 29 and 31 and their associated respective coatings 33, 35 and 37 are different and will therefore be discussed.

The coatings 33, 35 and 37 are respectively applied to the mirrors 27, 29 and 31 to impart to those mirrors reflectivities that collectively operate to suppress the 2.01 micron laser line so that the laser crystal 13 will sustain a laser emission only at a wavelength of substantially 1.96 microns. Like in the two mirror embodiment of FIG. 1, the product of the reflectivities of the coated mirrors 27, 29 and 31 should be sufficiently larger at 1.96 microns than it is at 2.01 microns so that the laser 11 will only produce a laser emission at a wavelength of substantially 1.96 microns. Therefore, as in the two-mirror embodiment of FIG. 1, the reflectivity product of the coated mirrors 27, 29 and 31 in FIG. 4 should be at least 75% at 1.96 microns, and preferably 75% to 90%, while the reflectivity product of those coated mirrors should be no more than 25% at 2.01 microns. For example, if the coated mirrors 27, 29 and 31 respectively have preferred reflectivities of 99%, 99% and 90% at 1.96 microns and have respective reflectivities of 70%, 70% and 40% at 2.01 microns, then the reflectivity products of those coated mirrors would be about 88% at 1.96 microns and about 20% at 2.01 microns. It should be realized that different combinations of mirror reflectivities could be selected to produce the desired reflectivity products at the 1.96 micron and 2.01 micron wavelengths.

Therefore, what has been described in a preferred embodiment of the invention is a room-temperature solid state laser for producing a laser emission at a wavelength of substantially 1.96 microns with a slope efficiency of at least 1%.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A room temperature solid state laser comprising:
    a laser cavity defined by a plurality of reflective elements forming a reflective path thereamong, said reflective elements having associated coatings thereon that are specifically designed to enable said reflective elements to collectively reflect radiation at a wavelength of substantially 1.96 microns and to collectively produce substantial loss in radiation at a wavelength of substantially 2.01 microns, each said coating on each of said reflective elements has an associated reflectivity to said wavelength of substantially 1.96 microns and an associated reflectivity to said wavelength of substantially 2.01 microns, the product of said reflectivities of said coated elements at said wavelength of 1.96 microns is at least 75%, and the product of said reflectivities of said coated elements at said wavelength of 2.01 microns is no more than 25%;
    a laser crystal disposed in said laser cavity, said laser crystal having a host crystal material capable of accepting $Cr^{3+}$ ions and $Tm^{3+}$ ions, an effective amount of $Cr^{3+}$ ions in said host crystal material, and an effective amount of $Tm^{3+}$ ions in said host crystal material; and
    means for exciting said laser crystal to lase at substantially 1.96 microns and at substantially 2.01 microns;
    said coated reflective elements collectively operating to produce substantial loss in radiation from said excited laser crystal at a wavelength of substantially 2.01 microns and to reflect radiation from said excited laser crystal at a wavelength which will sustain a laser emission only at the wavelength of substantially 1.96 microns, and said effective amounts of $Cr^{3+}$ and $Tm^{3+}$ ions being sufficient to enable said excited laser crystal to produce said laser emission at substantially 1.96 microns with a slope efficiency of at least 1%.

2. A room temperature solid state laser comprising:
a laser cavity defined by a plurality of reflective elements forming a reflective path thereamong, said reflective elements having associated coatings thereon that are specifically designed to enable said reflective elements to collectively reflect radiation at a wavelength of substantially 1.96 microns and to collectively produce substantial loss in radiation at a wavelength of substantially 2.01 microns;
a laser crystal disposed in said laser cavity, said laser crystal having a host crystal material capable of accepting $Cr^{3+}$ ions and $Tm^{3+}$ ions, an effective amount of $Cr^{3+}$ ions in said host crystal material, and an effective amount of $Tm^{3+}$ ions in said host crystal material; and
means for exciting said laser crystal to lase at substantially 1.96 microns and at substantially 2.01 microns;
said coated reflective elements collectively operating to produce substantial loss in radiation from said excited laser crystal at a wavelength of substantially 2.01 microns and to reflect radiation from said excited laser crystal at a wavelength which will sustain a laser emission only at the wavelength of substantially 1.96 microns, and said effective amounts of $Cr^{3+}$ and $Tm^{3+}$ ions being sufficient to enable said excited laser crystal to produce said laser emission at substantially 1.96 microns with a slope efficiency of at least 1%, said plurality of reflective elements comprising first and second mirrors opposing each other on a common axis to form a reflective path therebetween, said coated first mirror having substantially 99% reflectivity to a wavelength of substantially 1.96 microns and substantially 70% reflectivity to a wavelength of substantially 2.01 microns and said coated second mirror having substantially 90% reflectivity to a wavelength of substantially 1.96 microns and substantially 30% reflectivity to a wavelength of substantially 2.01 microns.

3. The laser of claim 1 wherein:
said coated first mirror has a plano-concave shape; and
said coated second mirror has a flat shape.

4. A room temperature solid state laser comprising:
a laser cavity defined by a plurality of reflective elements forming a reflective path thereamong, said reflective elements having associated coatings thereon that are specifically designed to enable said reflective elements to collectively reflect radiation at a wavelength of substantially 1.96 microns and to collectively produce substantial loss in radiation at a wavelength of substantially 2.01 microns;
a laser crystal disposed in said laser cavity, said laser crystal having a host crystal material capable of accepting $Cr^{3+}$ ions and $Tm^{3+}$ ions, an effective amount of $Cr^{3+}$ ions in said host crystal material, and an effective amount of $Tm^{3+}$ ions in said host crystal material; and
means for exciting said laser crystal to lase at substantially 1.96 microns and at substantially 2.01 microns;
said coated reflective elements collectively operating to produce substantial loss in radiation from said excited laser crystal at a wavelength of substantially 2.01 microns and to reflect radiation from said excited laser crystal at a wavelength which will sustain a laser emission only at the wavelength of substantially 1.96 microns, and said effective amounts of $Cr^{3+}$ and $Tm^{3+}$ ions being sufficient to enable said excited laser crystal to produce said laser emission at substantially 1.96 microns with a slope efficiency of at least 1%, said plurality of reflective elements comprising first, second and third mirrors disposed in a triangular configuration about said laser crystal to form a reflective path thereamong, said coated first mirror having substantially 99% reflectivity to a wavelength of substantially 1.96 microns and substantially 70% reflectivity to a wavelength of substantially 2.01 microns, said coated second mirror having substantially 99% reflectivity to a wavelength of substantially 1.96 microns and substantially 70% reflectivity to a wavelength of substantially 2.01 microns and said coated third mirror having substantially 90% reflectivity to a wavelength of substantially 1.96 microns and substantially 40% reflectivity to a wavelength of substantially 2.01 microns.

5. The laser of claim 1 wherein:
said host crystal material is selected from the group consisting of YAG, YSGG, GSGG, GSAG, YSAG, YAlO, GGG, YGG and LLGG.

6. The laser of claim 5 wherein:
said host crystal material is doped with an amount of $Cr^{3+}$ ions between 0.3% and 3% and with an amount of $Tm^{3+}$ ions between 3% and 12%.

7. The laser of claim 5 wherein:
said host crystal material is selected from the group consisting of YAG, YSAG and YSGG.

8. The laser of claim 7 wherein:
said host crystal material is doped with an amount of $Cr^{3+}$ ions between 0.3% and 1.5% and with an amount of $Tm^{3+}$ ions between 4.5% and 7.5%.

9. The laser of claim 5 wherein:
said host crystal material is YAG.

10. The laser of claim 9 wherein:
said host crystal material is doped with an amount of $Cr^{3+}$ ions between 0.6% and 0.9% and with an amount of $Tm^{3+}$ ions between 5% and 6%.

11. The laser of claim 1 wherein:
said exciting means is a pulsed flashlamp for applying pulses of light to said laser crystal.

12. The laser of claim 11 wherein:
said exciting means is a Xenon flashlamp.

13. The laser of claim 5 wherein:
said $Cr^{3+}$ and $Tm^{3+}$ doped laser crystal is responsive to light from said exciting means for absorbing that light in the $^4T_1$ and $^4T_2$ bands of said $Cr^{3+}$ ions, resulting in a nonradiative transfer of the excitation from the thermally mixed $^4T_2/^2E$ levels of the $Cr^{3+}$ ions to the $^3F_3$ level of the $Tm^{3+}$ activator ions and a crossrelaxation among the $Tm^{3+}$ ions to populate the $^3F_4$ upper laser level to enable said laser crystal to lase at the laser transition originating from one of the Stark levels of the $^3F_4$ manifold and terminating on one of the $^3H_8$ Stark levels in order to produce radiation with the wavelengths of substantially 1.96 microns and substantially 2.01 microns.

14. The laser of claim 1 wherein:

said laser crystal is substantially in the form of a cylindrical laser rod whose long dimension is along the cylinder axis; and said exciting means is a flashlamp having a long dimension along a first axis which is substantially parallel to said cylinder axis of said cylindrical laser rod for enabling said $Cr^{3+}$ ions in said cylindrical laser rod to absorb light from said flashlamp along the long dimension of said laser rod.

15. The laser of claim 14 wherein:
said host crystal material is doped with an amount of $Cr^{3+}$ ions between 0.3% and 3% and with an amount of $Tm^{3+}$ ions between 3% and 12%.

16. The laser of claim 14 wherein:
said host crystal material in said laser rod is selected from the group consisting of YAG, YSAG and YSGG.

17. The laser of claim 19 wherein:
said host crystal material is doped with an amount of $Cr^{3+}$ ions between 0.3% and 1.5% and with an amount of $Tm+$ ions between 4.5% and 7.5%.

18. The laser of claim 17 wherein:
said host crystal material in said laser rod is YAG.

19. The laser of claim 18 wherein:
said YAG host crystal material is doped with an amount of $Cr^{3+}$ ions between 0.6% and 0.9% and with an amount of $Tm^{3+}$ ions between 5% and 6%.

* * * * *